United States Patent [19]

Krug et al.

[11] Patent Number: 4,704,408

[45] Date of Patent: Nov. 3, 1987

[54] PROCESS FOR THE MANUFACTURE OF A SILICONE FOAM

[75] Inventors: Wolfgang Krug; Gottfried Knispel, both of Leverkusen; Dieter Wrobel, Cologne, all of Fed. Rep. of Germany

[73] Assignee: Bayer Aktiengesellschaft, Leverkusen-Bayerwerk, Fed. Rep. of Germany

[21] Appl. No.: 800,134

[22] Filed: Nov. 20, 1985

[30] Foreign Application Priority Data

Nov. 30, 1984 [DE] Fed. Rep. of Germany ....... 3443677

[51] Int. Cl.$^4$ .............................................. C08J 9/12
[52] U.S. Cl. ....................... 521/82; 521/88; 521/91; 521/92; 521/116; 521/117; 521/122; 521/124; 521/154; 528/15; 528/31; 528/32; 528/33
[58] Field of Search ....................... 528/15, 31, 32, 33; 521/82, 88, 91, 92, 116, 117, 122, 124, 154

[56] References Cited

U.S. PATENT DOCUMENTS

| | | | |
|---|---|---|---|
| 3,677,981 | 7/1972 | Wada et al. | 521/154 |
| 4,024,091 | 5/1977 | Lee et al. | 521/154 |
| 4,026,835 | 5/1977 | Lee et al. | 521/154 |
| 4,026,842 | 5/1977 | Lee et al. | 521/154 |
| 4,026,843 | 5/1977 | Kittle | 521/154 |
| 4,026,844 | 5/1977 | Kittle | 521/154 |
| 4,026,845 | 5/1977 | Kim et al. | 521/154 |
| 4,108,833 | 8/1978 | Hatonaka et al. | 521/154 |
| 4,189,545 | 2/1980 | Modic | 521/154 |
| 4,367,293 | 1/1983 | Shimizu | 521/154 |
| 4,418,157 | 11/1983 | Modic | 521/154 |
| 4,461,851 | 7/1984 | Hashimoto | 521/154 |
| 4,490,488 | 12/1984 | Cush | 521/154 |

*Primary Examiner*—Morton Foelak
*Attorney, Agent, or Firm*—Connolly & Hutz

[57] ABSTRACT

A process for manufacturing foamed silicone compositions by foaming a cross-linkable composition which comprises:

(a) 100 parts by weight of a vinyl-containing polysiloxane containing 0.0002 to 3% by weight of vinyl groups and a viscosity of from 0.1 to 1,000 Pascal-seconds at 25° C., (b) up to 10 parts by weight of a silanol-containing silicon compound with a viscosity from 0.01 to 10 Pascal-seconds at 25° C., (c) up to 200 parts by weight of filler, (d) 1 to 50 parts by weight of a polysiloxane with a viscosity of 0.005 to 0.1 Pascal-seconds at 25° C., and (e) a platinum catalyst, is characterized by foaming the cross-linkable composition with a substance containing hydroxyl groups at temperatures of 50° to 150° C.

9 Claims, No Drawings

PROCESS FOR THE MANUFACTURE OF A SILICONE FOAM

The present invention relates to a process for the manufacture of high-grade silicone foams, especially those prepared from platinum-catalyzed thermosetting organopolysiloxane compositions which can be physically foamed in a simple manner.

Siloxane foams have been known in industry for a relatively long time. U.S. Pat. No. 2,857,343 describes the foaming of a peroxidic vulcanized silicone rubber with decomposable blowing agents which split off $N_2$ or $CO_2$. The release of $H_2$ by the reaction of stearic acid with alkali metal borohydrides can also be used to manufacture silicone foams (U.S. Pat. No. 2,951,819). It is known from U.S. Pat. No. 3,425,967 that platinum-catalyzed addition systems with asbestos of fibrous potassium titanate can be foamed by blowing agents which split off nitrogen under the action of heat, such as azo-bisisobutyronitrile, dinitrosopentamethylenetetramine, benzenesulphonyl hydrazide, N,N'-dimethyldinitrosoterephthalamide, p,p'-oxybis(benzenesulphonyl hydrazide), terephthalazide or azodicarbonamide.

U.S. Pat. No. 3,677,981 describes similar platinum-catalyzed silicone mixtures which do not contain fibrous solids and which contain azobisisobutyronitrile, dinitrosopentamethylenetetramine, N,N'-dimethyldinitrosoterephthalamide or diaminobenzene as blowing agents.

A number of other suggestions describe the use of hydrogen, formed in the reaction of hydrogenosiloxanes with hydroxyl groups, as a blowing agent.

Foamable condensation systems with metal salts, such as dibutyltin laurate, as catalysts are known from U.S. Pat. Nos. 2,956,032, 3,070,555, 3,271,332, 3,338,847, 3,428,580 and 3,429,838.

The use of such metal salts, which catalyze the condensation of SiOH groups and at the same time the reaction of hydrogensiloxanes with silanol-containing siloxanes, enables foaming and crosslinking even at room temperature.

This procedure can also be applied to platinum-catalyzed addition systems, as shown by U.S. Pat. No. 3,923,705 and U.S. Pat. No. 4,189,545. Platinum complexes catalyze both the addition of hydrogenosiloxanes onto vinylsiloxanes and the reaction of SiH with SiOH to form hydrogen. Both reactions contribute to the crosslinking and hence the vulcanization of the mixtures. In place of siloxanols, it is also possible to use alcohols or water as compounds containing hydroxyl groups, as taught by U.S. Pat. No. 4,026,843 and U.S. Pat. No. 4,189,545.

Disadvantages of these compositions foamed by hydrogen are the release of a readily flammable gas and the additional crosslinking sites formed in the reaction of SiH with SiOH or with ROH or $H_2O$. The quantities of hydrogen necessary for a foaming process cause relatively high crosslinking densities, which produce poor tear strengths.

There was therefore a need for a foaming process which did not modify the crosslinking reactions. The systems known hitherto (U.S. Pat. Nos. 2,857,343, 3,425,967 and 3,677,981), in which vulcanization proceeds independently of foaming, contain blowing agents decomposable only at high temperatures and are therefore incapable of satisfying the demands made on them.

The advantages of addition vulcanization free of scission products, compared with peroxidic crosslinking, are offset again by the decomposition residues of the blowing agents. An expensive solution to this problem is mechanical foaming with subsequent application of a vacuum (U.S. Pat. No. 4,368,279).

BRIEF DESCRIPTION OF THE INVENTION

With this situation, the object of the present invention was to provide a technically simple process for the manufacture of qualitatively high-grade and physiologically acceptable foamed plastics based on silicone.

Surprisingly, it has been found that platinum-catalyzed addition systems including vinyl-containing siloxanes and special hydrogenosiloxanes can be physically foamed with substances containing hydroxyl groups, such as alcohols, or water or a mixture of water and alcohol.

DETAILED DESCRIPTION

The present invention thus relates to a process for the manufacture of optionally fire-resistant, foamed silicone compositions by foaming a crosslinkable composition which contains:
(a) 100 parts by weight of a vinyl-containing base polymer of the formula

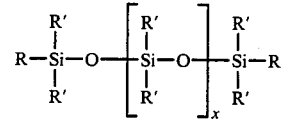

in which
R and R' are alkyl radicals having 1 to 8 carbon atoms, aryl (e.g. Phenyl), vinyl radicals and fluoroalkyl radicals having 3 to 8 carbon atoms, with the proviso that the polymer contains 0.0002 to 3% by weight of vinyl groups, and
x is a sufficiently large number that the viscosity of the polymer ranges from 0.1 to 1000 Pascal seconds (from 100 to 1,000,000 cP) at 25° C.,
(b) 0 to 10 parts by weight of a silanol-containing silicone compound with a viscosity in the range from 0.010 to 1 Pascal-seconds (10 to 1000 cP) at 25° C., the organic groups of said compound being selected from alkyl radicals having 1 to 8 carbon atoms, vinyl radicals, aryl radicals and fluoroalkyl radicals having 3 to 8 carbon atoms, with the proviso that the polymer has a silanol content of 2 to 10%,
(c) 0 to 200 parts by weight of a filler,
(d) 1 to 50 parts by weight of a polysiloxane of the formula

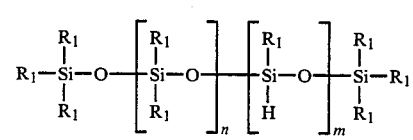

in which
$R_1$ is an alkyl radical having 1 to 8 carbon atoms, aryl (e.g. Phenyl) or fluoroalkyl radicals having 3 to 8 carbon atoms,
m is a number greater than or equal to 3, and the sum of n+m is a sufficiently large number such that the polymer has a viscosity in the range 0.005-0.1 Pascal-seconds at 25° C., and (e) 1 to 250 ppm of a platinum catalyst and, if appropriate, emulsifiers, inhibitors or further auxiliaries, which process is characterized in that the crosslinkable composition, if appropriate mixed with inert blowing agents, is foamed with a substance containing hydroxyl groups, at temperatures of 50° C. to 150° C.

Kinetic investigations show that the blowing process only starts at the boiling point of the foaming agent used. Significant quantities of hydrogen, which produce additional crosslinking sites, are not formed. Compositions of this type thus permit the foaming of silicone mixtures which are optimized in respect of their mechanical specifications. In particular, it is possible to foam silicone mixtures with relatively low crosslinking densities and high tear strengths.

The foaming in the process of this invention is achieved by use of inert agents such as water, alcohol or aqueous alcohol mixtures. Because foaming is achieved by vaporization of the inert agents, their boiling points are generally at most about 150° C. Accordingly, the alcohols contemplated by this invention are lower alkanols or mixtures which have a boiling point either in pure state or as an azeotrope of at most about 150° C. Examples of suitable alcohols include methanol, ethanol, propanol, butanol, pentanol, hexanol and so forth. In addition to alcohols and water, it is also possible to use any other compounds, for example fluorohydrocarbons, which have a sufficiently low boiling point and do not show an inhibitory action on the catalyst. Preferably, water is used in the process according to the invention.

Particularly advantageously, it is possible to foam relatively low-viscosity two-component silicone rubbers which reach high mechanical strengths in the vulcanized state. The combination of addition vulcanization free of scission products with the possibility of using H₂O as a non-flammable blowing agent enables silicone foams to be manufactured without polluting the environment. The dispersion of silicone-insoluble foaming agents in the rubber can be improved by emulsifiers. U.S. Pat. No. 4,026,844 shows that, in addition systems which are foamed with hydrogen, foaming with microwaves is made possible by aliphatic alcohols or metal oxides. Accordingly, with the compositions of this invention, microwave foaming processes can be carried out with, for example, as little as 1.5% by weight of water as the blowing agent. The addition of carbon black is of advantage in that it increases the sensitivity to microwaves and also forms nuclei for production of the foam.

Suitable components (a), (b) and (d) for the process according to the invention are well known in the art. Many are commercially available.

Examples of suitable fillers for the process according to the invention are pyrogenic and precipitated, finely divided silicic acids with a BET specific surface area of 50-400 m²/g. Such fillers can be surface-modified, for example with organosilicon compounds. The modification can also be effected during incorporation by the addition of hexamethyldisilazane or tetramethyldivinylsilazane, for example, and the addition of water.

Other fillers which can be used are substances such as, for example, diatomaceous earth, finely divided quartz powders, chalks, amorphous silicic acids or carbon blacks.

The Pt catalysts are the catalysts normally used for addition-crosslinking systems; for example, Pt(O) complexes with vinylsiloxanes as ligands can be used in particular.

According to the invention, it may also be necessary to use inhibitors. Suitable inhibitors are acetylenic alcohols such as, for example, 2-methylbut-3-yn-2-ol, ethynylcyclohexanol, tetramethyltetravinylcyclotetrasiloxane or tetramethyldivinyldisiloxane.

Furthermore, it may also be necessary to use emulsifiers such as, for example, polyethylene glycols, stabilizers, agents for assisting incorporation, or cell regulators.

In a general embodiment, the process according to the invention is carried out in approximately the following manner.

The crosslinkable mixture consisting of the vinyl-containing polymer, the polysiloxane containing Si-H, the catalyst, the crosslinking inhibitor and a filler, if appropriate with a loading agent, is uniformly mixed with a blowing agent which does not form hydrogen, preferably water, an agent for assisting incorporation being used if appropriate. This mixture is foamed by the application of heat (for example microwaves, IR radiation, hot air) and simultaneously crosslinked.

The process according to the invention makes it possible to manufacture silicone foams whose mechanical properties for a given foam structure can be adjusted independently of the blowing process. In particular, it is possible to manufacture tear-resistant and non-rigid foams characterized by particularly low compression sets at elevated temperatures.

The present invention is illustrated in greater detail with the aid of the examples which follow.

EXAMPLE 1

88 parts by weight of a polydimethylsiloxane having a vinyl chain stopper, with a viscosity of 1 Pa.s/20° C., 3 parts by weight of a siloxane-loaded pyrogenic silicic acid with a BET specific surface area of 130 m²/g, 2.6 parts by weight of a polydimethylsiloxane with 20 mol% of SiH groups and having a trimethylsiloxy chain stopper, 0.025 part by weight of tetramethyltetravinylcyclotetrasiloxane, 0.002 part by weight of a complex of platinum and tetramethyltetravinylcyclotetrasiloxane, 2 parts by weight of water and 5 parts by weight of an emulsifier of the structure

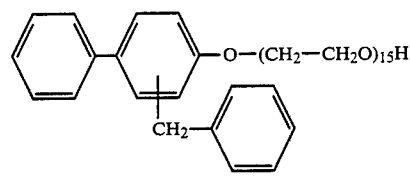

are vigorously mixed in a dissolver so that the water is finely dispersed in the silicone system (emulsion). The mixture is then heated in an open polyethylene beaker in a microwave oven. After 100° C. has been reached, the mixture foams slowly and, after a further 10 minutes, has set to an elastic low-density foam.

EXAMPLE 2

30 parts by weight of a pyrogenic silicic acid with a BET specific surface area of 300 m²/g are mixed, at 140° C., with 90 parts by weight of a polydimethylsiloxane having a vinyl chain stopper, with a viscosity of 10 Pa.s, and 9 parts by weight of a short-chain polydimethylsiloxane having a hydroxyl chain stopper, with a viscosity of 0.05 Pa.s, and, after cooling to room temperature, the mixture is diluted with 130 parts by weight of the abovementioned siloxane having a vinyl chain stopper.

The base mixture prepared in this way is mixed as in Example 1 with the following quantities of the additives mentioned therein: 1.9 parts by weight of a siloxane with SiH groups, 0.035 part by weight of tetramethyltetravinylcyclotetrasiloxane, 0.006 part by weight of Pt catalyst, 2 parts by weight of water and 5 parts by weight of emulsifier, and the resulting mixture is foamed.

EXAMPLE 3

In a kneader, 47 parts by weight of a polydimethylsiloxane having a vinyl chain stopper, with a viscosity of 10 Pa.s, are mixed with 4 parts by weight of hexamethyldisilazane, 0.3 part by weight of tetramethyldivinyldisilazane and 3 parts by weight of water and the mixture is then kneaded to a homogeneous composition with 18 parts by weight of pyrogenic silicic acid with a BET specific surface area of 300 m²/g (incorporation of the filler in accordance with German Offenlegungsschrift No. 2 535 334). The mixture was then heated to 130° C. and stirred for 1.5 hours in the closed kneader, after which water and excess silazane were removed at 160° C. in vacuo. After the compound has cooled, the mixture is mixed with the following additives in accordance with Example 1 and foamed: 24 parts by weight of a polydimethylsiloxane having a vinyl chain stopper, with a viscosity of 1 Pa.s, 7.8 parts by weight of a siloxane with SiH groups, 0.025 part by weight of tetramethyltetravinylcyclotetrasiloxane, 0.0023 part by weight of Pt catalyst, 6 parts by weight of water and 5 parts by weight of emulsifier.

Gas chromatographic analysis of the gases released shows a hydrogen content of 0.2% by volume.

EXAMPLE 4

This example is similar to Example 3 except that the siloxane with SiH groups mentioned in Example 1 is replaced with a polydimethylsiloxane having a dimethylhydridosiloxy chain stopper, with a viscosity of 0.0015 Pa.s, the SiH concentration in the compound being the same; a hydrogen content of 27% by volume is found under the same conditions as in Example 3.

What is claimed is:

1. A process for the manufacture of foamed silicone compositions by foaming a crosslinkable composition comprising:
   (a) 100 parts by weight of a vinyl-containing base polymer of the formula

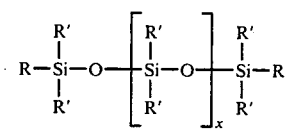

wherein
   R and R' are alkyl having 1 to 8 carbon atoms, aryl having 6 to 12 carbon atoms, vinyl or fluoroalkyl radicals having 3 to 8 carbon atoms, with the proviso that the polymer contains 0.0002 to 3% by weight of vinyl groups, an
   x is a number which is sufficiently large so that the viscosity of the polymer ranges from 0.1 to 1000 Pascal-seconds at 25° C.,
   (b) up to 10 parts by weight of a silanol-containing silicon compound with a viscosity in the range from 0.010 to 1 Pascal-seconds at 25° C., the organic moiety being alkyl having 1 to 8 carbon atoms, vinyl, aryl having 6 to 12 carbon atoms or fluoroalkyl having 3 to 8 carbon atoms, with the proviso that the polymer has a silanol content of 2 to 10%,
   (c) up to 200 parts by weight of a filler,
   (d) 1 to 50 parts by weight of a polysiloxane of the formula

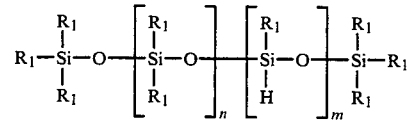

wherein
   R₁ is alkyl having 1 to 8 carbon atoms, aryl having 6 to 12 carbon atoms or fluoroalkyl having 3 to 8 carbon atoms,
   m is a number of at least 3 and
   n is a number such that the sum of n and m is sufficiently large so that the polymer has a viscosity in the range 0.005–0.1 Pascal-seconds at 25° C., and
   (e) 1 to 250 ppm of a platinum catalyst, characterized in that the crosslinkable composition is foamed with a substance containing hydroxyl groups, at temperatures of 50° to 150° C.

2. A process as claimed in claim 1 wherein said substance containing hydroxyl groups is water.

3. A process as claimed in claim 1 wherein said substance containing hydroxyl groups is an alkanol containing 1 to 6 carbon atoms.

4. A process as claimed in claim 1 wherein the substance containing hydroxyl groups is a mixture of water and an alkanol having 1 to 6 carbon atoms.

5. A process as claimed in claim 1 wherein the crosslinkable composition additionally comprises an emulsifier, stabilizer, cell regulator, or inhibitor.

6. A process according to claim 5 wherein the emulsifier is polyethylene glycol.

7. A process according to claim 5 wherein the inhibitor is an acetylinic alcohol.

8. A process according to claim 1 wherein the filler is finely divided silicic acids, diatomaceous earths, finely divided quartz powders, chalks, amorphous silicic acids or carbon blacks.

9. A process according to claim 1 wherein the foaming is at temperatures of 50° to 150° C. provided by microwave energy, infrared radiation or hot air.

* * * * *